(12) United States Patent
Young et al.

(10) Patent No.: US 11,928,639 B2
(45) Date of Patent: Mar. 12, 2024

(54) VALIDATING SECURE DELIVERY OF INFORMATION HANDLING SYSTEMS

(71) Applicant: Dell Products, L.P., Round Rock, TX (US)

(72) Inventors: Jason Matthew Young, Round Rock, TX (US); Marshal F. Savage, Austin, TX (US); Mukund P. Khatri, Austin, TX (US)

(73) Assignee: Dell Products, L.P.

( * ) Notice: Subject to any disclaimer, the term of this patent is extended or adjusted under 35 U.S.C. 154(b) by 84 days.

(21) Appl. No.: 17/137,903

(22) Filed: Dec. 30, 2020

(65) Prior Publication Data

US 2022/0207474 A1 Jun. 30, 2022

(51) Int. Cl.
*G06Q 10/0833* (2023.01)
*G06F 21/36* (2013.01)
*G06F 21/57* (2013.01)
*G06Q 10/083* (2023.01)

(52) U.S. Cl.
CPC ......... *G06Q 10/0833* (2013.01); *G06F 21/36* (2013.01); *G06F 21/575* (2013.01); *G06Q 10/0838* (2013.01)

(58) Field of Classification Search
CPC .............. G06Q 10/08; G06Q 10/0833; G06Q 10/0838; G06Q 50/28; G06Q 50/30
See application file for complete search history.

(56) References Cited

U.S. PATENT DOCUMENTS

| 9,037,912 | B1 * | 5/2015 | Klein | G06Q 10/087 714/36 |
| 2008/0231426 | A1 * | 9/2008 | Kamel | G06Q 10/087 340/10.4 |
| 2020/0042933 | A1 * | 2/2020 | Jurich, Jr | G06Q 10/0832 |

OTHER PUBLICATIONS

Khan, Minhaj Ahmad, and Khaled Salah. "IoT security: Review, blockchain solutions, and open challenges." Future generation computer systems 82 (2018): 395-411 (Year: 2018).*

* cited by examiner

*Primary Examiner* — Scott M Tungate
(74) *Attorney, Agent, or Firm* — Fogarty LLP

(57) ABSTRACT

Embodiments provide methods for validating secure delivery of an IHS (Information Handling System) by confirming that the packages by which the IHS was delivered include only the packages used to ship the IHS from a factory or other trusted entity. During factory provisioning of the IHS, a shipping certificate is uploaded to the IHS, where the certificate includes shipping identifiers that are each associated with a package used to ship the IHS. Upon receiving packages by which the IHS has been shipped, shipping identifiers, such as bar codes and RFID codes, are collected from the received packages. The shipping identifiers collected from the received packages are compared against the shipping identifiers from the shipping certificate in order to validate the plurality of received packages as the same packages that were used to ship the IHS.

19 Claims, 8 Drawing Sheets

VALIDATING SECURE DELIVERY OF INFORMATION HANDLING SYSTEMS

FIELD

The present disclosure relates generally to Information Handling Systems (IHSs), and relates more particularly to IHS security.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Different types of IHSs may be purchased along with a variety of additional items. For instance, tablet IHSs may be purchased along with items such as external keyboards, pointing devices and protective covers. In other instances, laptop IHSs may be purchased with items such as external monitors, docking stations, external storage drives, charging cords and travel bags. In other instances, rack-mounted server IHSs may be purchased along with items such as structural rack elements, cords, hot-swappable storage drives, power supply units and auxiliary cooling systems. These various types of additional items may be shipped to a customer, along with the IHS, in a shipment that is comprised of multiple packages.

Malicious actors have devised a multitude of attacks for comprising IHSs. In one type of attack, a malicious actor may compromise an IHS through a compromised external device that interfaces with the IHS. In such attacks, a malicious actor may intercept items such as external devices that have been ordered in conjunction with an IHS and may replace the shipment of a genuine external device with a shipment of a compromised external device. In another scenario, a malicious actor may instead add a compromised external device to a shipment of items that are delivered along with an IHS. Detecting such types of tampering with the delivery of items that are ordered in conjunction with an IHS serves to protect the IHS from being compromised by administrators unknowingly coupling compromised external devices to the IHS.

SUMMARY

Various embodiments provide methods for validating secure delivery of an IHS (Information Handling System). The methods may include: retrieving a plurality of shipping identifiers collected from a plurality of received packages; retrieving a plurality of shipping identifiers specified in a shipping certificate uploaded to the IHS during factory provisioning of the IHS, wherein each of the plurality of shipping identifiers in the shipping certificate are associated with a package used to ship the IHS; and comparing the plurality of shipping identifiers collected from the received packages against the plurality of shipping identifiers from the shipping certificate in order to validate the plurality of received packages as the same packages used to ship the IHS.

In additional method embodiments, the shipping identifiers specified in the shipping certificate further include shipping identifiers associated with packages used to ship additional items for use with the IHS. In additional method embodiments, the comparison validates the received packages are the same packages used to ship the IHS and the additional items. In additional method embodiments, the comparison identifies any shipping identifiers from the shipping certificate that are not present in the shipping identifiers collected from the received packages. In additional method embodiments, the comparison identifies any of the shipping identifiers collected from the received packages that are not present in the shipping identifiers from the shipping certificate. In additional method embodiments, the shipping identifiers comprise bar codes. In additional method embodiments, the validation of secure delivery of the IHS is conducted by a pre-boot validation process of the IHS. In additional method embodiments, the shipping certificate is uploaded to a persistent memory of the IHS during the factory provisioning of the IHS. In additional method embodiments, the shipping certificate is uploaded to the persistent memory via operations by a remote access controller of the IHS.

Various additional embodiments provide IHSs that may include: a persistent memory comprising a shipping certificate uploaded to the persistent memory during factory provisioning of the IHS, wherein the shipping certificate specifies a plurality of shipping identifiers, each of which is associated with a package used to ship the IHS; one or more processors; and one or more memory devices coupled to the processors, the memory devices storing computer-readable instructions that, upon execution by the processors, cause a validation process to: retrieve the plurality of shipping identifiers specified in the shipping certificate uploaded to the persistent memory during the factory provisioning of the IHS; and compare shipping identifiers collected from a plurality of received packages against the plurality of shipping identifiers from the shipping certificate in order to validate the plurality of received packages as the same packages used to ship the IHS.

In additional IHS embodiments, the shipping identifiers specified in the shipping certificate further include shipping identifiers associated with packages used to ship additional items for use with the IHS, and wherein the comparison validates the received packages are the same packages used to ship the IHS and the additional items. In additional IHS embodiments, the shipping identifiers comprise bar codes. In additional IHS embodiments, the validation process is a pre-boot process of the IHS. In additional IHS embodiments, the IHS may further include a remote access controller, wherein the shipping certificate is uploaded to the persistent memory via the remote access controller. In additional IHS embodiments, the shipping identifiers comprise RFID (Radio Frequency Identification) codes.

Various additional embodiments provide computer-readable storage devices storing instructions for validating secure delivery of an IHS (Information Handling System). Execution of the instructions by one or more processors of the IHS causes a validation process of the IHS to: retrieve a plurality shipping identifiers specified in a shipping certificate uploaded to a persistent memory of the IHS during factory provisioning of the IHS, wherein each of the plurality of shipping identifiers in the shipping certificate is associated with a package used to ship the IHS; retrieve shipping identifiers collected from a plurality of received packages; and compare the shipping identifiers collected from the plurality of received packages against the plurality of shipping identifiers from the shipping certificate in order to validate the plurality of received packages as the same packages used to ship the IHS.

In additional storage device embodiments, the shipping identifiers specified in the shipping certificate further include shipping identifiers associated with packages used to ship additional items for use with the IHS. In additional storage device embodiments, the validation process is a pre-boot process of the IHS. In additional storage device embodiments, the shipping certificate is uploaded to the persistent memory via operations by a remote access controller of the IHS. In additional storage device embodiments, the shipping identifiers comprise one or more of RFID (Radio Frequency Identification) codes and bar codes.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
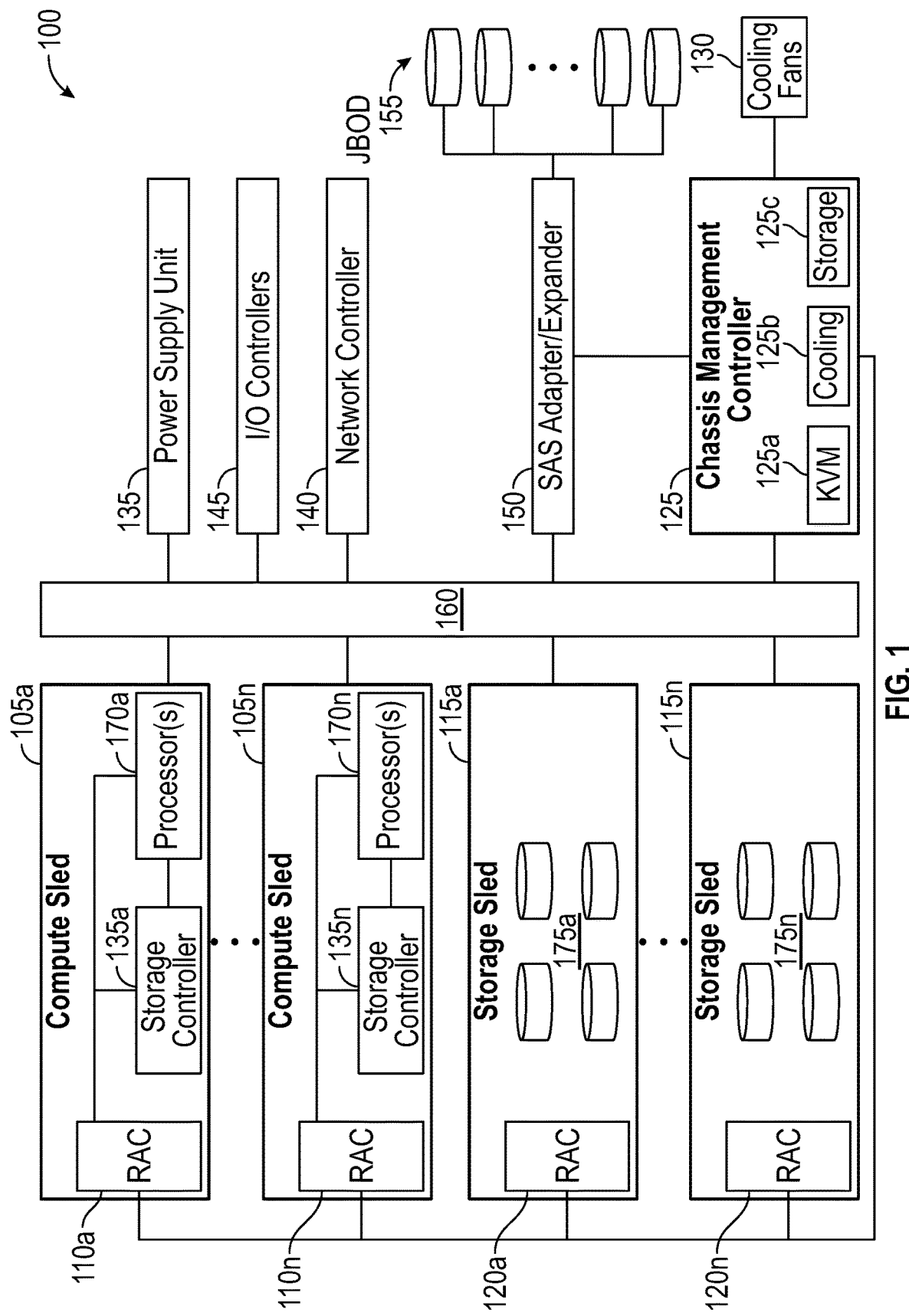
FIG. 1 is a diagram illustrating certain components of a chassis, according to some embodiments, for supporting validation of the secure delivery of components of the chassis and of additional items ordered in conjunction with the chassis.

FIG. 1 is a block diagram illustrating certain components of a chassis 100 comprising one or more compute sleds 105a-n and one or more storage sleds 115a-n that may be configured to implement the systems and methods described herein for supporting validation of the secure delivery of the chassis 100 and of additional items ordered in conjunction with the chassis. Embodiments of chassis 100 may include a wide variety of different hardware configurations. Such variations in hardware configuration may result from chassis 100 being factory assembled to include components specified by a customer that has contracted for manufacture and delivery of chassis 100. As described in additional detail below, chassis 100 may include capabilities that allow a customer to validate that the hardware components of chassis 100 are the same components that were installed at the factory during its manufacture and may also include capabilities that allow a customer to validate that, when chassis 100 is delivered to a customer it is delivered only with the packages that were shipped to the customer by a trusted entity.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100. When chassis 100 is ordered, it may be ordered with various types of sleds 105a-n, 115a-n that may be packaged separately from chassis 100, but may shipped along with chassis 100 as part of a single order. In such scenarios, embodiments support validation of the secure delivery of chassis 100 such that it is delivered only with packaged sleds 105a-n, 115a-n that were shipped by a trusted entity.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads. When chassis 100 is ordered, it may be ordered with various types of structural rack elements that will be used to house chassis 100, such as adapters that allow installation of chassis 100 in a particular rack. Such rack elements may be packaged separately from chassis 100, but may shipped along with chassis 100 as part of a single order. In such scenarios, embodiments support validation of the secure delivery of chassis 100 such that it is delivered only with packaged rack elements that were shipped by a trusted entity.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100.

Figure 2:
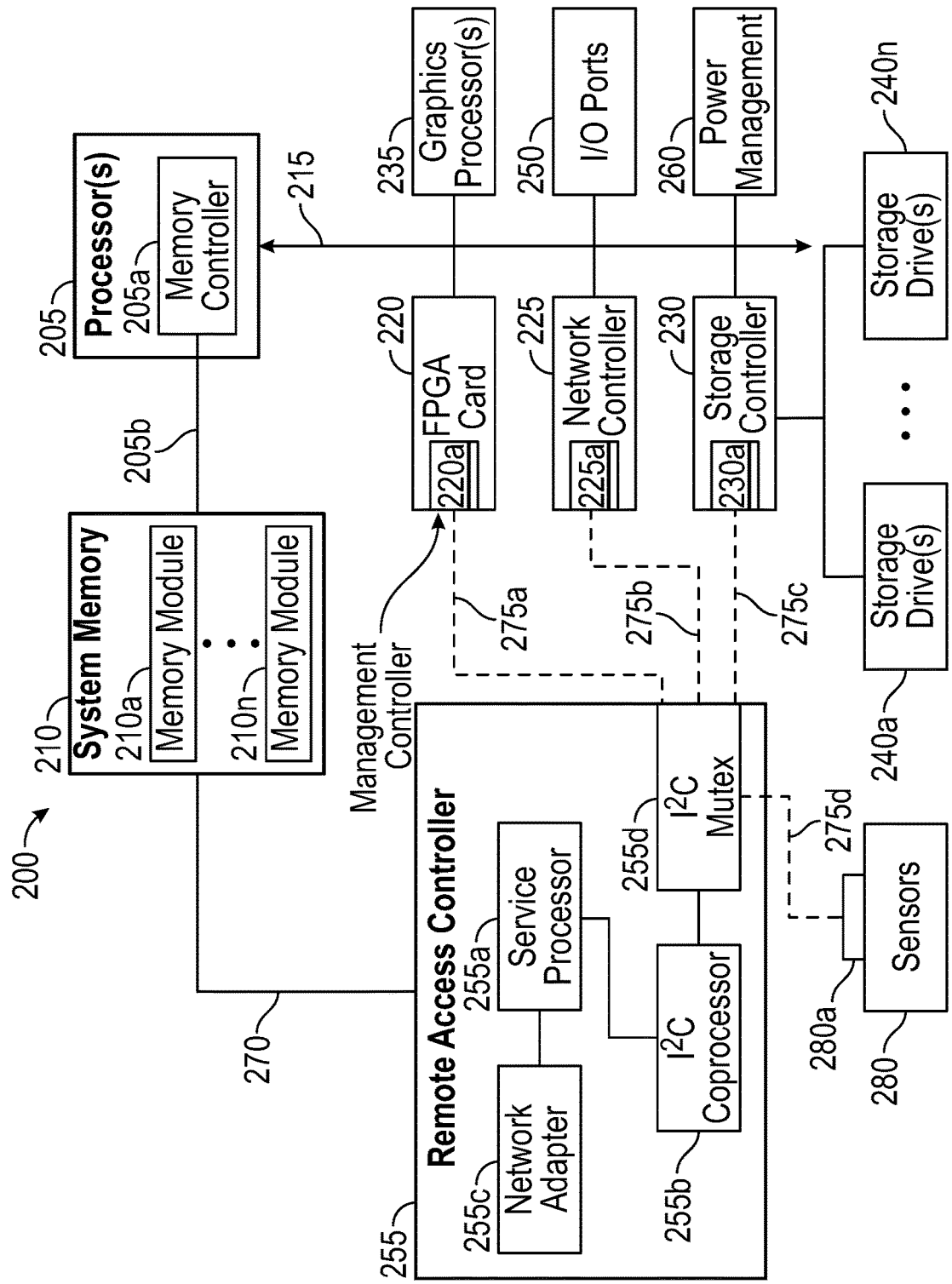
FIG. 2 is a diagram illustrating certain components of an IHS configured as a component of a chassis, according to some embodiments, for supporting validation of the secure delivery of the IHS and of additional items ordered in conjunction with the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

In some embodiments, each compute sled 105a-n installed in chassis 100 may be uniquely identified based on a code or other identifier that may be permanently encoded in a non-volatile memory of a respective compute sled 105a-n by its manufacturer. As described below, embodiments support validation of each compute sled 105a-n as being a compute sled that was installed at the factory during the manufacture of chassis 100. Also as described below, during a provisioning phase of the factory assembly of chassis 100, a signed certificate that specifies hardware components of chassis 100 that were installed during its manufacture may be stored in a non-volatile memory that may be accessed by a remote access controller 110a-n of a compute sled 105a-n. Using this signed inventory certificate, a customer may validate that the hardware components of chassis 100 are the same components that were installed at the factory during its manufacture.

As described with regard to the below embodiments, also during the provisioning phase of the factory assembly of chassis 100, a signed shipping certificate may be additionally or alternatively stored in a non-volatile memory that may be accessed by a remote access controller 110a-n of a compute sled 105a-n. The shipping certificate may include shipping identifiers for each of the packages used in the delivery of chassis 100 and of any additional items ordered in conjunction with chassis 100. Based on this signed shipping certificate, a customer may validate that chassis 100 has been delivered only with packages that were shipped to the customer by a trusted entity. In some embodiments, rather than utilize a separate shipping certificate and a separate inventory certificate, shipping identifiers and the inventory of the factory-installed hardware may be included within a single signed certificate.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drives 155 may each be uniquely identified based on a code or other identifier that may be permanently encoded in a non-volatile memory of a SAS expander 150 or storage drive 155 by its respective manufacturer. In instances where SAS expander and storage drives 155 are factory installed, as described below, embodiments may support validation of SAS expander 150 and storage drives 155 as being the same SAS expander and storage drives that were installed at the factory during the manufacture of chassis 100. When chassis 100 is ordered, it may be ordered with a SAS expander 150 and with various storage drives 155 that may be packaged separately from chassis 100, but may shipped along with chassis 100 as part of a single order. In such scenarios, embodiments support validation of the secure delivery of chassis 100 such that it is delivered only with SAS expander 150 and/or storage drive 155 packages that were shipped by a trusted entity.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. In instances where storage sleds 115a-n is factory installed, as described below, embodiments support validation of each storage sled 115a-n as being a storage sled that was installed at the factory during the manufacture of chassis 100. When chassis 100 is ordered, it may be ordered with one or more storage sleds 115a-n that may be packaged separately from chassis 100, but may shipped along with chassis 100 as part of a single order. In such scenarios, embodiments support validation of the secure delivery of chassis 100 such that it is delivered only with packaged storage sleds 115a- that were shipped by a trusted entity.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In such embodiments, when chassis 100 is ordered, it may be ordered with a hot-swappable power supply unit 135 that may be packaged separately from chassis 100, but may shipped along with chassis 100 as part of a single order. In such scenarios, embodiments support validation of the secure delivery of chassis 100 such that it is delivered only with packaged power supply units 135 that were shipped by a trusted entity. In some embodiments, a power supply unit 135 may be uniquely identified based on a code or other identifier that may be permanently encoded in a non-volatile memory of the power supply unit 135 by its manufacturer. In instances where power supply unit 135 is factory installed, as described below, embodiments support validation of power supply unit 135 as being the same power supply unit that was installed at the factory during the manufacture of chassis 100.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting validation of the secure delivery of the IHS 200 and of additional items ordered in conjunction with the IHS 200. It should be appreciated that although the embodiments described herein may describe an IHS that is a compute sled or similar computing component that may be deployed within the bays of a chassis, other embodiments may be implemented via other types of IHSs that may also support validation of the secure delivery of the IHS 200 and of additional items ordered in conjunction with IHS 200. In the illustrative embodiment of FIG. 2, IHS 200 may be a computing component, such as compute sled 105a-n or other type of server, such as an 1 RU server installed within a 2 RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture. In some instances, rather than being factory installed, certain components of IHS 200 may be packaged separately from IHS 200, but may shipped along with IHS 200 as part of a single order. Additionally, in some instances, IHS 200 may be shipped via multiple packages. As described below, embodiments support validation of the secure delivery of IHS 200 such that it is delivered only with packages that were shipped by a trusted entity.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200. Embodiments may also support validation that a motherboard on which processor 205 is mounted is the same motherboard that was installed during factory assembly of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200.

IHS 200 may include one or more storage controllers 230 that may be utilized to access storage drives 240a-n that are accessible via the chassis in which IHS 200 is installed. Storage controllers 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 200. Although a single storage controller 230 is illustrated in FIG. 2, IHS 200 may include multiple storage controllers that may operate similarly to storage controller 230. In embodiments where storage drives 240a-n are hot-swappable devices that are received by bays of chassis, the storage drives 240a-n may be coupled to IHS 200 via couplings between the bays of the chassis and a midplane or backplane 245 of IHS 200. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations. In some embodiments, storage controllers 230 and storage drives 240a-n may each be uniquely identified based on a code or other identifier that may be permanently encoded in a non-volatile memory of these devices by their respective manufacturers. As described below, embodiments may support validation of storage controllers 230 and storage drives 240a-n as being the same components that were installed at the factory during the manufacture of IHS 200.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory and/or shipping certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as describe below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200.

As described with regard to the below embodiments, also during the provisioning phase of the factory assembly of IHS 200, a signed shipping certificate may be additionally or alternatively stored in a non-volatile memory of IHS 200, such as a persistent memory that is accessed via remote access controller 255. The shipping certificate includes shipping identifiers for each of the packages used in the delivery of IHS 200 and in the delivery of any additional items ordered in conjunction with IHS 200. Based on this signed shipping certificate, a customer may validate that IHS 200 and any additional items for use with the IHS have been delivered using only packages that were shipped to the customer by a trusted entity. In some embodiments, rather than utilize a separate shipping certificate and a separate inventory certificate, an inventory of shipping identifiers and an inventory of the factory-installed hardware may be included within a single signed certificate.

In support of the capabilities for validating the detected hardware components of IHS 200 against the inventory information that is specified in a signed inventory certificate and for validating the delivery of only items that were shipped by the seller of IHS 200, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory and/or shipping information collected during the factory assembly of IHS 200 such that the integrity of this signed inventory and/or shipping information may be validated at a later time using the public key by a customer that has purchased IHS 200. Using these cryptographic capabilities of the remote access controller, the factory installed inventory and/or shipping information that is included in a signed certificate may be anchored to a specific remote access controller 255, since the keypair used to sign the inventory and/or shipping information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory and/or shipping information that is signed using this private key is further anchored to the root of trust of IHS 200. If a root of trust cannot be established through validation of the remote access controller cryptographic functions that are used to access the hardware root key, the private key used to sign inventory and/or shipping information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
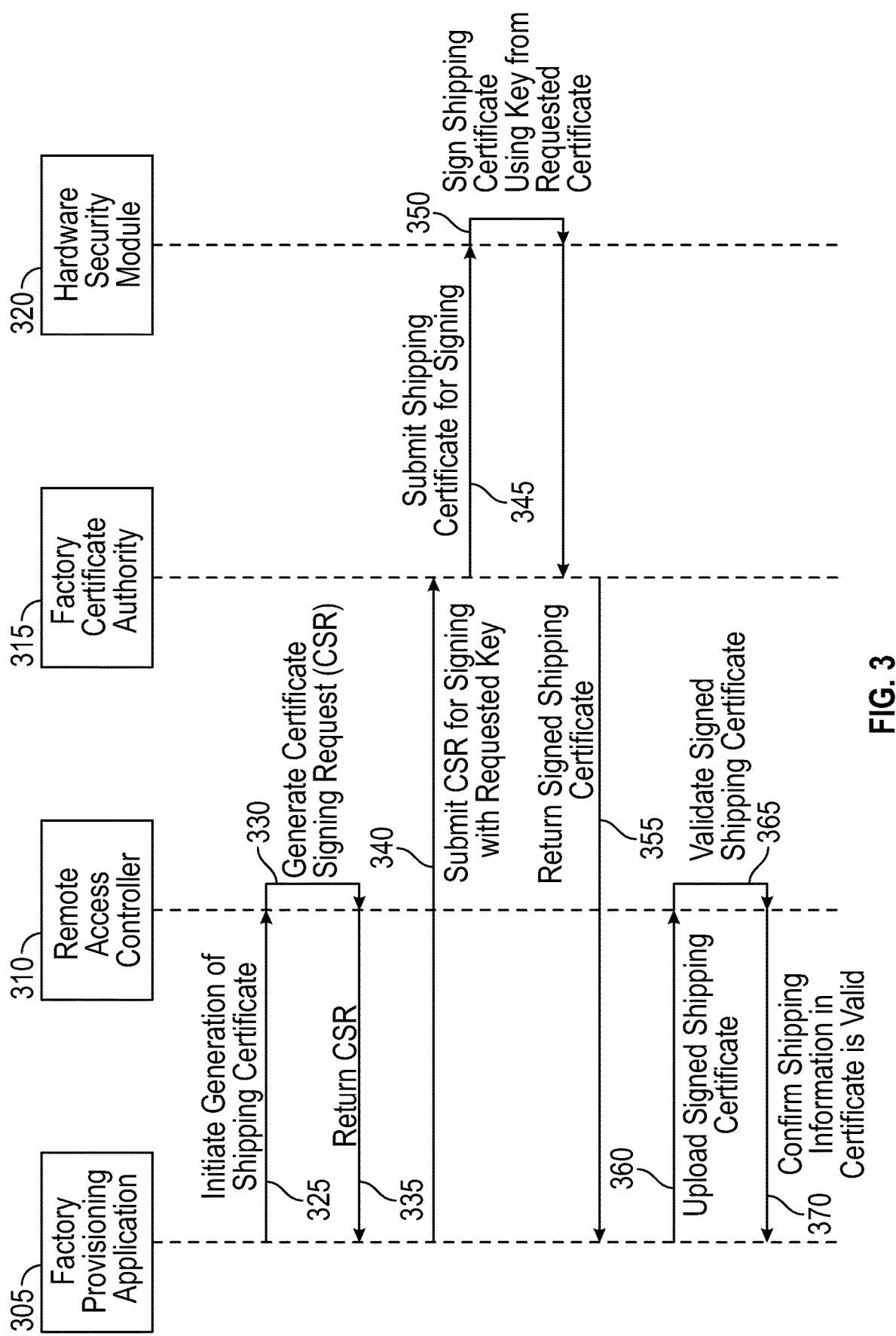
FIG. 3 is a swim lane diagram illustrating certain responsibilities of components of a system configured according to certain embodiments for factory provisioning of an IHS in a manner that supports validation of the secure delivery of the IHS and of additional items ordered in conjunction with the IHS.
Figure 4:
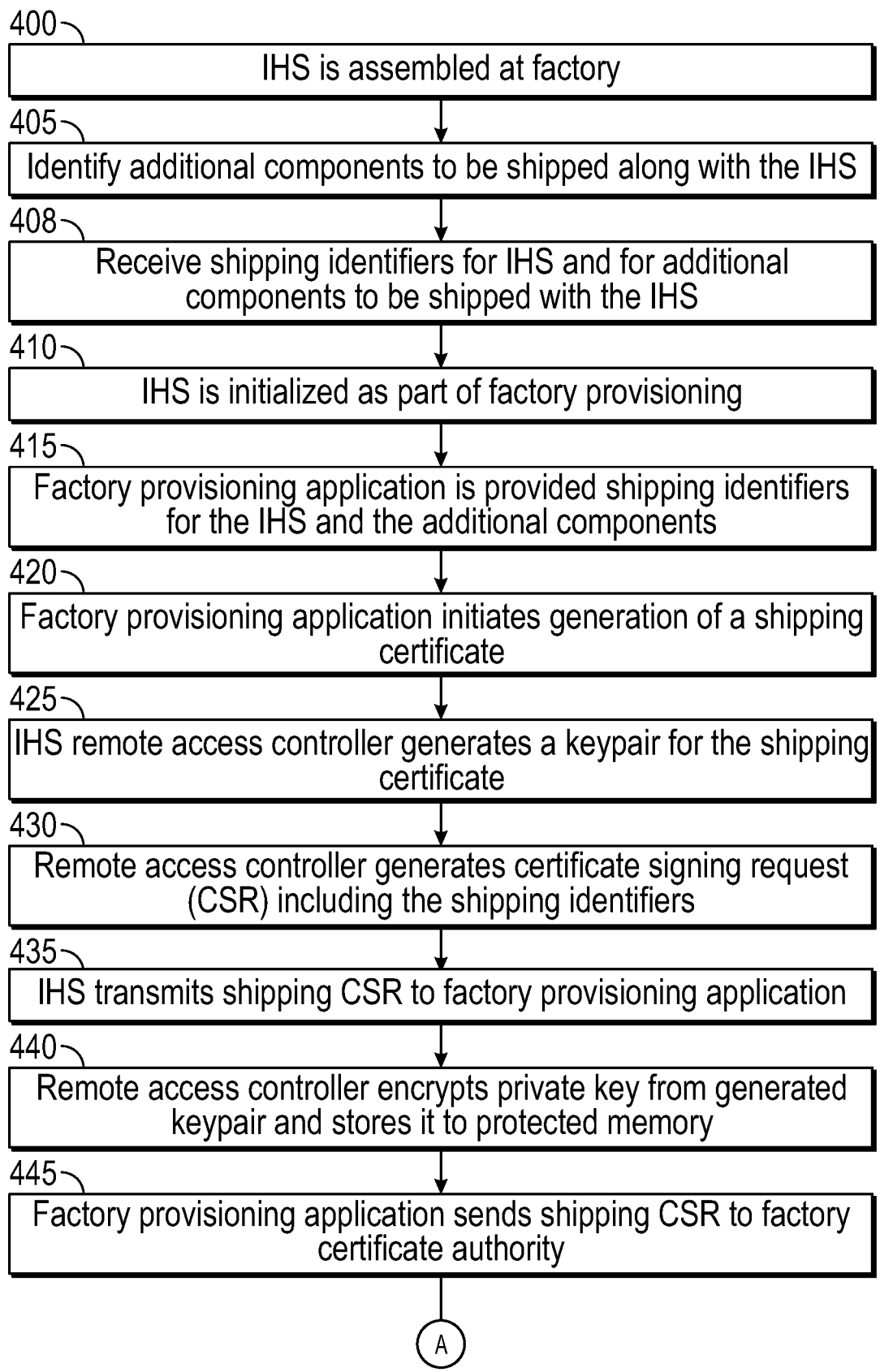
FIG. 4 is a flowchart describing certain steps of a method, according to some embodiments, for assembly and provisioning of an IHS in a manner that supports the validation of the secure delivery of the IHS and of additional items ordered in conjunction with the IHS.
Figure 4:
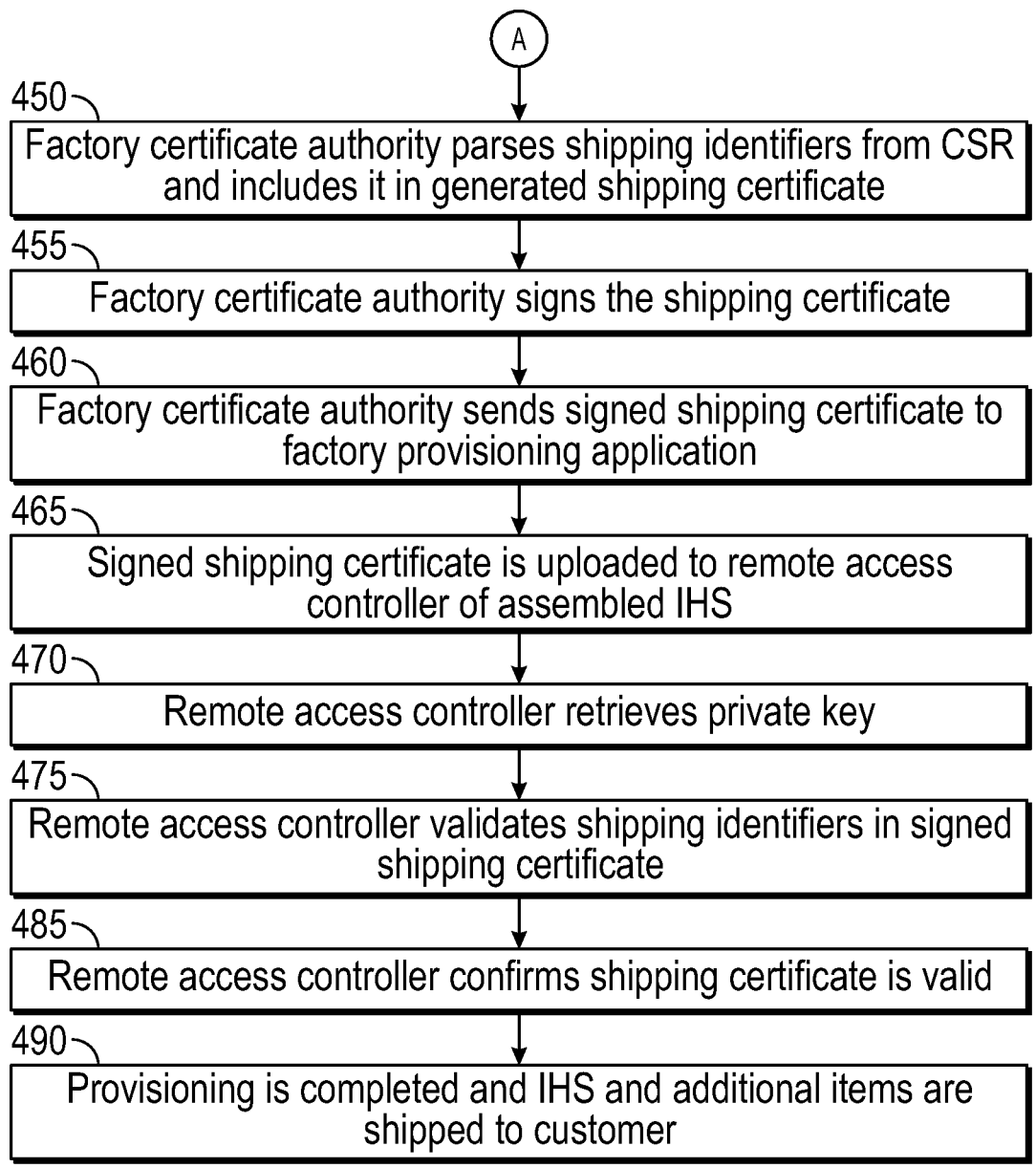

FIG. 3 is a swim lane diagram illustrating certain responsibilities of components of a system configured according to certain embodiments for factory provisioning of an IHS in a manner that supports validation of the secure delivery of the IHS and of items ordered in conjunction with the IHS. FIG. 4 is a flowchart describing certain steps of a method, according to some embodiments, for assembly and provisioning of an IHS in a manner that supports the validation of the secure delivery of the IHS and of items ordered in conjunction with the IHS. Some embodiments of the method of FIG. 4 may begin, at block 405, with the factory assembly of an IHS, such as the assembly of a server or chassis described with regard to FIGS. 1 and 2. In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS. Once the assembly of an IHS has been completed, the IHS may be subjected to manual and automated inspections that confirm the IHS has been properly assembled and does not include any defects.

In some embodiments, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. In some embodiments, this manifest may be supplemented with identification information for devices that are not installed in the IHS but are instead being separately packaged and shipped along with the IHS.

As described above, an IHS may be ordered along with a wide variety of additional items that may be separately packaged from the IHS, but may be shipped to the customer along with the IHS. Some additional items may be accessories or components that do not present security vulnerabilities. For instance, an IHS such as a tablet may be purchased along with a protective cover or a charging cord. An IHS such as a laptop may be purchased with a travel bag or various types of cables, such as a USB cable or an HDMI cable. An IHS such as a rack-mounted server maybe purchased along various types of cables or along with structural rack elements, such as an adapter that supports installation of a server in a specific type of rack. For these types of additional items that do not present security vulnerabilities, validation of the secure delivery of these items nonetheless assures that a customer receives shipment of all items that were ordered in conjunction with an IHS.

However, an IHS may also be purchased along with a wide variety of additional items that may present security vulnerabilities, and that are shipped along with the IHS, but are separately packaged from the IHS. For instance, an IHS such as a tablet may be purchased along with an external keyboard or a smart pen. If such external devices are separately packaged for delivery to a customer purchasing a tablet IHS, a malicious actor could intercept the shipment and replace one of the packages with a package containing a compromised device, such as an external keyboard outfitted with keylogging capabilities. In a scenario where a rack-mounted server IHS is purchased, the server may be purchased along with devices such as hot-swappable storage drives or a network switch. Such devices present significant security vulnerabilities that could compromise not only the purchased server, but may also compromise servers throughout a datacenter. Malicious actors could substitute packages containing compromised devices for genuine devices shipped along with a server. A malicious actor could also add a package that contains a compromised device to a shipment. In such a scenario, if no one detects that the sever has been delivered with an item that was not ordered, an administrator could unknowingly install a compromised device to the server.

Upon completing assembly of an IHS, at block 405, all additional items that were ordered by a customer and that are to be shipped in conjunction with the IHS are identified. In some instances, such additional items may be shipped from the facility that includes the factory used to assemble and provision an IHS. In other instances, the additional items ordered in conjunction with an IHS may be shipped from a nearby facility or from a facility at another location. As described, such additional items may include hardware and software for use with the ordered IHS and may include various types of accessories or components that facilitate use of the IHS. At block 408, shipping identifiers are received for each of the packages that are part of the shipment of an IHS and the additional items ordered in conjunction with the IHS. In some instances, the shipping identifier for each package may include a bar code, matrix code, alphanumeric code, RFID tag, or other type of machine-readable identifier that will be affixed to or included in a package. In some instances, such shipping identifiers may be generated by a factory shipping system and may be provided to the factory provisioning system that will used to configure the IHS prior to its delivery.

Upon collecting shipping identifiers for use in shipping an IHS and any additional items to a customer, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application, where this factory provisioning application may run on one or more servers and may interface with an IHS that is being provisioned once a requisite amount of firmware and software has been installed to the IHS.

At block 415, the shipping identifiers that are collected for shipment of an IHS and of separately packaged items are provided to the factory provisioning application that is being used to provision the assembled IHS. Upon receipt of this shipping information, at block 420, the factory provisioning application initiates the generation of a shipping certificate that may be used to validate that the IHS package(s) and additional item packages that are received by a customer are the same packages that were shipped to the customer.

In some embodiments, the hardware that is identified in the manifest generated during assembly of an IHS is also provided to the factory provisioning application used to provision the assembled IHS. Based on this hardware manifest information, the factory provisioning application may also initiate the generation of an inventory certificate that may be used to validate that the detected hardware components of the IHS are the same hardware components that were installed during the factory assembly of the IHS. In some embodiments, the shipping identifiers and hardware manifest are included in single certificate that may be used to validate both the secure delivery and the secure factory assembly of an IHS.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of a shipping certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of a shipping certificate by generating a cryptographic key pair for use in validating the authenticity of shipping information that is included in a shipping certificate and that describes the packages used to ship to the IHS and additional items to the customer. In some embodiments, in addition to including shipping information, the shipping certificate may also include the hardware manifest for the IHS.

At block 430 and at 330, the remote access controller 310 generates a certificate signing request (CSR) for a digital identity certificate, where the request specifies the public key of the key pair generated by the remote access controller and also specifies the shipping identifiers that are collected for shipment of the IHS and of separately packaged items. The shipping identifiers included in the CSR may be signed by the remote access controller using the private key from the generated keypair. In some embodiments, the hardware manifest may also be signed and included in the same or a separate shipping certificate CSR that is generated by the remote access controller.

At block 435 and at 335, the CSR for the requested shipping certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the shipping and/or inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the shipping identifiers, any hardware inventory information, the public key generated by the remote access controller and the information specifying the requested signing key. Based on the information parsed from the CSR, the factory certificate authority generates a digital identity certificate, referred to herein as a shipping certificate, that is associated with the public key provided by the remote access controller and that specifies the shipping identifiers that are collected for shipment of an IHS and for any separately packaged items. In some embodiments, the shipping certificate may also specify the factory installed hardware inventory of the IHS. In some embodiments, the factory installed hardware inventory may be specified in a separate inventory certificate.

As indicated in FIG. 3, at 345, the factory certificate authority 315 submits the generated shipping certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted shipping certificate, which includes the shipping identifiers. The signed shipping certificate is then returned to the factory certificate authority 315 by the hardware security module 320.

At block 460 and at 355, the signed shipping certificate is transmitted from the factory certificate authority 315 to the factory provisioning application 305. At block 465 and at 360, the signed shipping certificate is than loaded to the assembled IHS. As indicated in FIG. 3, in some embodiments, the signed shipping certificate may be uploaded to a remote access controller 310 of the assembled IHS, such that the signed shipping certificate may be stored to a nonvolatile memory or other persistent storage that is accessible by the remote access controller 310 independent from the operating system of the IHS.

Some embodiments may continue, at 365, with the validation of the signed shipping certificate by the remote access controller 310. Using the public key from the generated keypair, at block 475, the remote access controller decrypts the signature included by the remote access controller in the CSR and confirms that the shipping information included in the signed shipping certificate matches the shipping information that was submitted in the certificate signing request, thus validating the integrity of the generation of the signed shipping certificate. At block 485, the remote access controller confirms that the shipping information included in the signed shipping certificate is valid and, at 370, the remote access controller 310 confirms the validity of the shipping certificate with a notification to the factory provisioning application 305. With the generation and validation of the signed shipping certificate completed, additional factory provisioning of the assembled IHS may be completed and, at block 490, the assembled IHS and the additional items may be shipped from the factory to a customer. As described, the packages used to IHS and the additional items are each identified using one of the shipping identifiers that are received at block 408.

Figure 5:
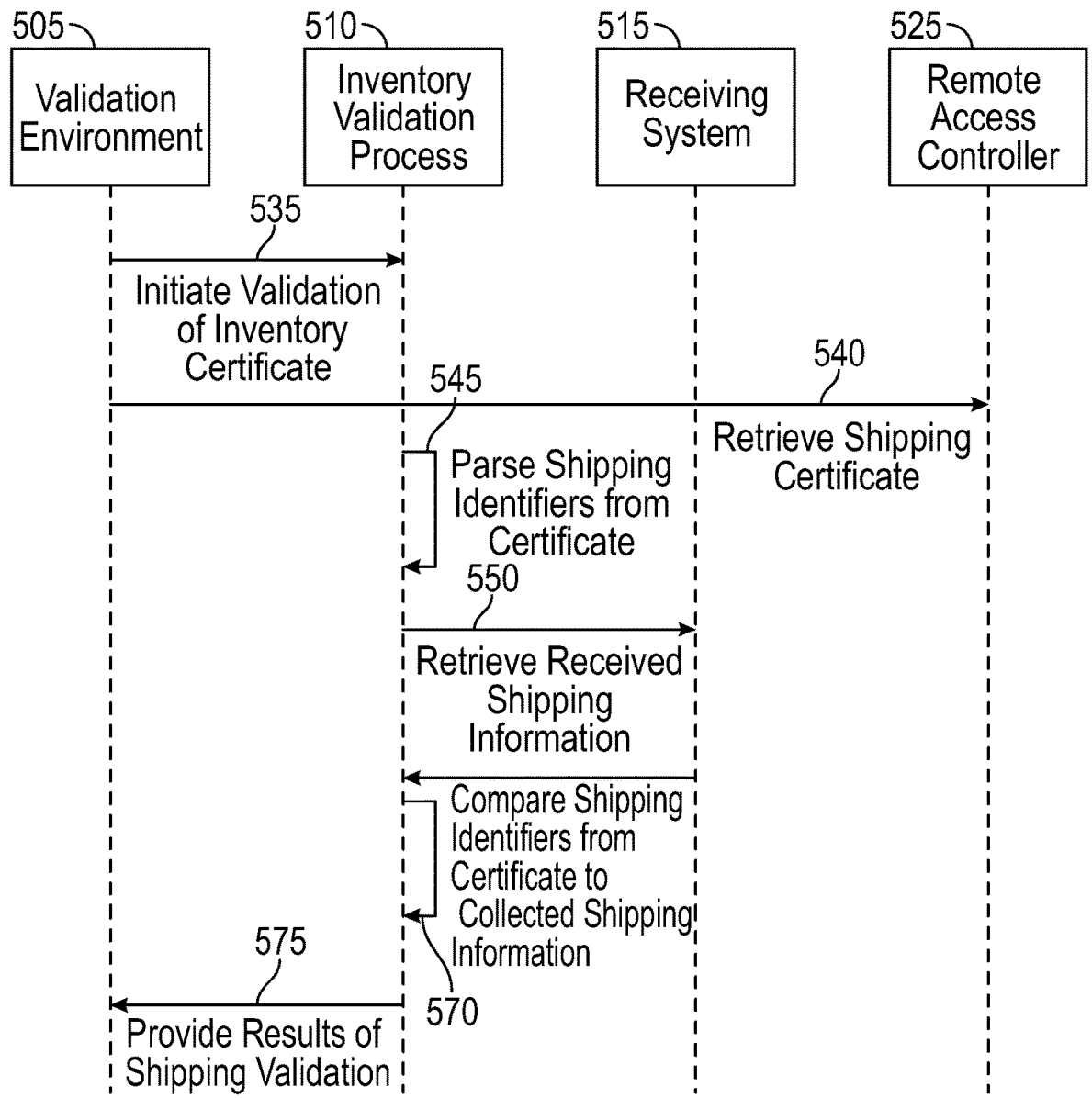
FIG. 5 is a swim lane diagram illustrating certain responsibilities of components of an IHS configured according to certain embodiments for validation of the secure delivery of the IHS and of additional items ordered in conjunction with the IHS.
Figure 6:
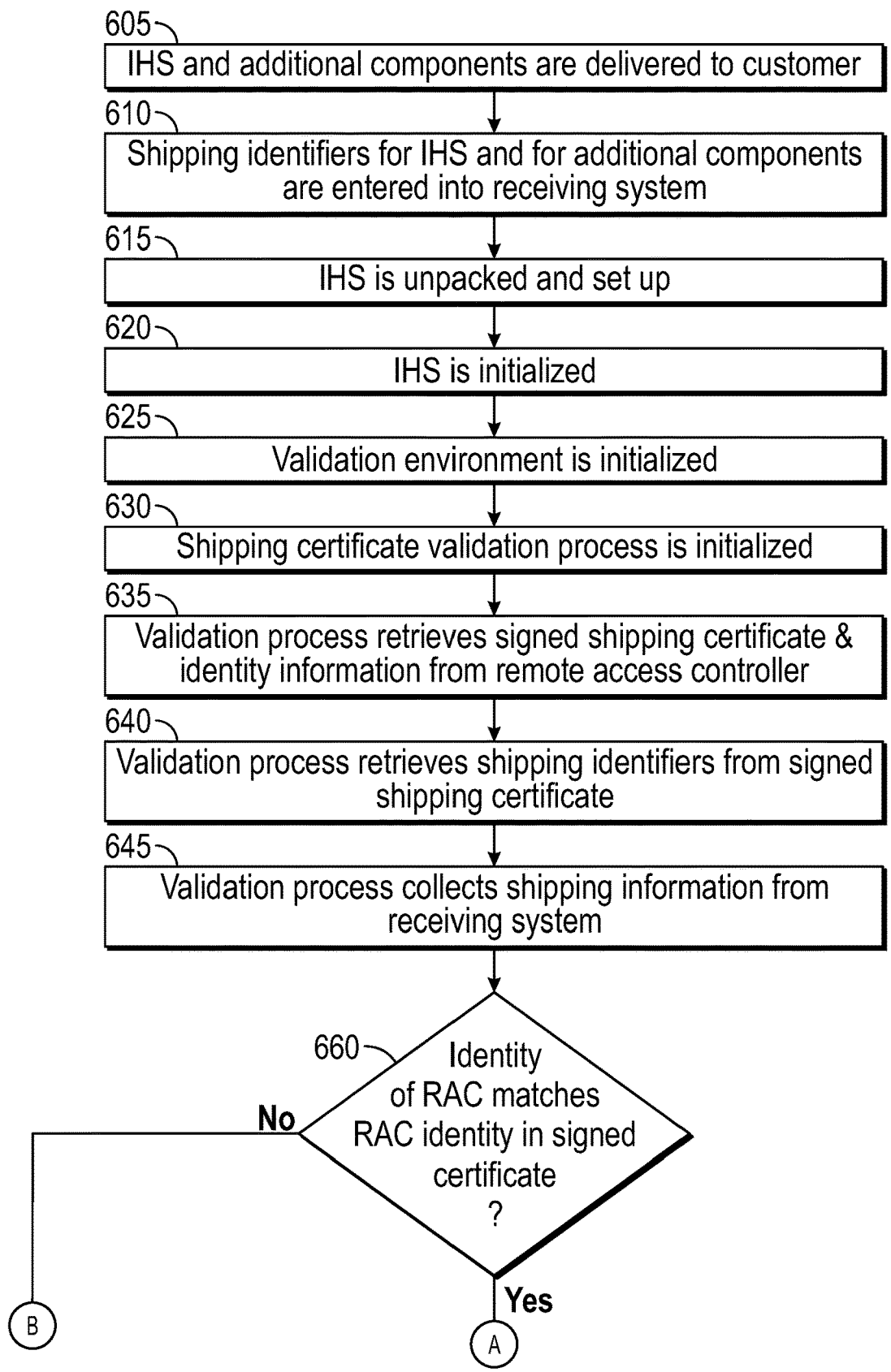
FIG. 6 is a flowchart describing certain steps of an additional method, according to some embodiments, for supporting the validation of the secure delivery of the IHS and of additional items ordered in conjunction with the IHS.
Figure 6:
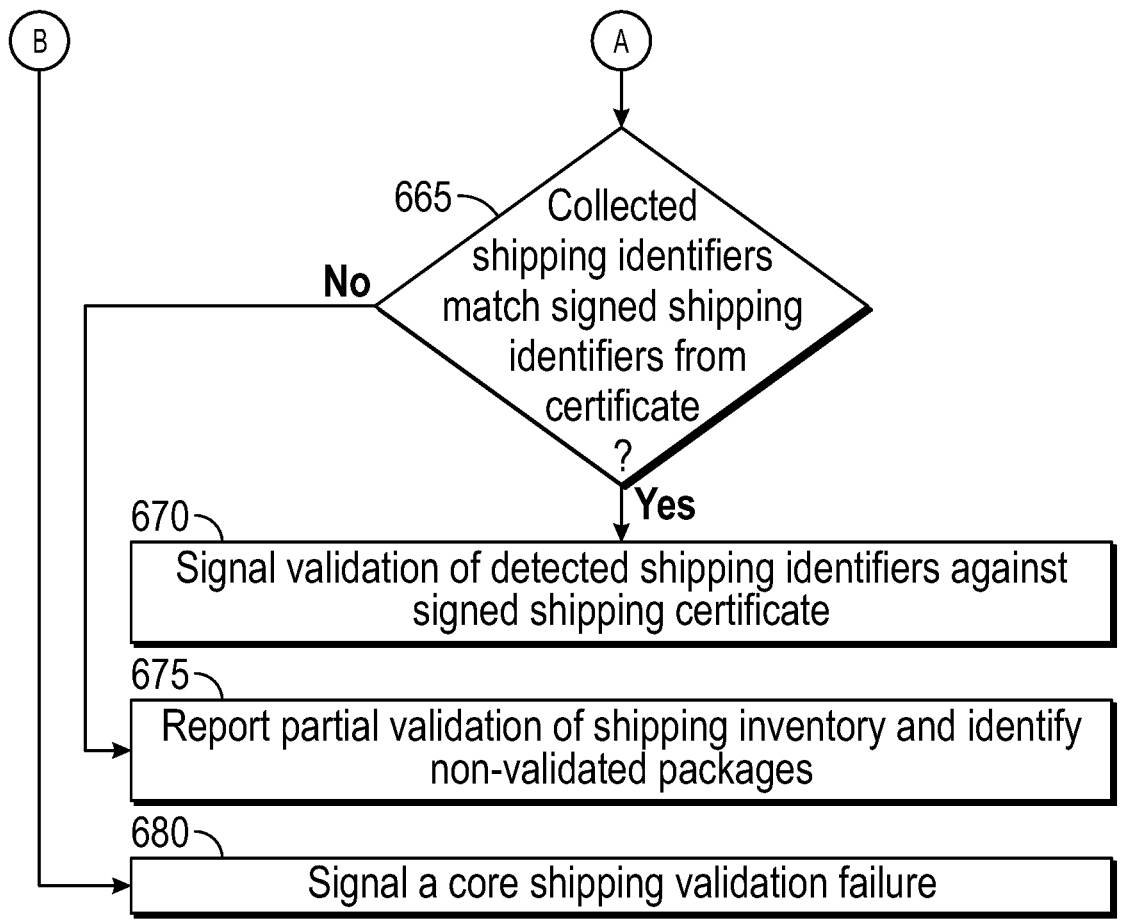

Upon delivery of the IHS, embodiments provide a customer with the capability of validating that the IHS package and additional item packages that are received by a customer are the same packages that were shipped to the customer by the seller of the IHS. Accordingly, FIG. 5 is a swim lane diagram illustrating certain responsibilities of components of an IHS configured according to certain embodiments for validation of the secure delivery of the IHS and of items shipped in conjunction with the IHS. FIG. 6 is a flowchart describing certain steps of a method, according to some embodiments, for validation of the secure delivery of an IHS and of items shipped in conjunction with the IHS. Embodiments may begin, at block 605, with the delivery of an IHS and of additional items to a customer, where the IHS has been assembled and provisioned according to the procedures set forth above. In particular, the delivered IHS has been provisioned at the factory to include a signed shipping certificate that specifies shipping identifiers for the package used to ship the IHS and for packages used to ship additional items purchased in conjunction with the IHS.

Upon receiving an IHS that is configured in this manner, at block 610, the shipping identifiers for each of the packages in the shipment may be collected. For instances, an individual may receive shipment of the packages and may collect the shipping identifiers from each of the packages, such as by scanning bar codes or other machine-readable identifiers affixed to the packages and/or by scanning RFID tags affixed to the packages or included within the packages. In some instances, an individual may be required to manually collect shipping identifiers and input them into a receiving system, while in other instances, shipping identifiers may be collected by automated tools utilized by the receiving system. Upon collecting the shipping identifiers from the received packages, the shipping identifiers may be uploaded to a receiving system utilized by the customer or on behalf of the customer.

After collection of the shipping identifiers, an IHS may then be unpacked and assembled by an administrator, at block 615. Some or all of the packages containing additional items delivered with IHS may also be unpacked. In some instances, an IHS may be ready for immediate deployment by a customer. In other instances, an IHS may require further provisioning by customer before it is deployed, such as for operation within a particular data center. As such, in various instances, an IHS may be unpacked, assembled, and initialized in order to deploy the IHS or in order to prepare it for further provisioning. Whether to deploy the IHS or to provision the IHS, at block 615, the IHS is initialized. At block 620, the IHS has been powered and a validation process of the IHS is initialized. In some embodiments, validation process may run within a pre-boot environment, such as a PXE (Preboot eXecution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described shipping validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

At block 630 and as indicated at 535 of FIG. 5, and shipping certificate validation process 510 is initiated within a validation environment 505 that may include a pre-boot environment, a diagnostic environment or other environment supporting the validation process. In some embodiments, the shipping certificate validation process 510 operates based on validated instructions, such as based on instructions that when used to calculate a hash value are confirmed to correspond to a value stored in an immutable memory of the IHS during its factory provisioning. In this manner, the shipping certificate validation process may be added to the root of trust of the IHS. At block 635 and as indicated at 540, the shipping certificate validation process 510 retrieves the signed shipping certificate from the remote access controller 525. As described above, the factory provisioning process may include uploading the signed shipping certificate to the remote access controller or to persistent memory of the IHS. At block 640 and as indicated at 545, the shipping certificate validation process 510 parses the shipping identifiers from the signed inventory certificate. Using the public key provided in the signed shipping certificate, the shipping validation process 510 may confirm the integrity of the shipping information that is included in the signed shipping certificate.

In some scenarios, the shipping certificate validation process 510 may retrieve, at block 645, the shipping identifiers that were collected from the packages and entered in the receiving system. In some instances, this collection of shipping information may be initiated earlier by the shipping certificate validation process, such as during initialization of the IHS. As described above, in some embodiments, a shipping certificate may also include an inventory of the factory installed hardware of the IHS. In other embodiments, such hardware inventory information may be included in a separate signed inventory certificate. In embodiments that include an inventory of factory-installed inventory, such inventory information may be retrieved and may be used to validate the received IHS includes only factory installed hardware components.

In some embodiments, the shipping certificate validation process may retrieve any hardware inventory information from the signed certificate stored by the IHS. From this hardware inventory, the identity of the factory installed remote access controller may be determined. Identify information for the remote access controller 525 that is detected in the initialized IHS may then be compared against the remote access controller identity information parsed from the certificate. In some instances, the detection of any discrepancies between the identity of the remote access controller specified in inventory certificate and the identity reported by remote access controller 525 may also result, at block 680, in signaling of a core shipping validation failure and in terminating any further validation procedures. Any discrepancies between the identity of the factory installed remote access controller and the remote access controller detected on the initialized IHS signals a potential compromise of the IHS.

If the remote access controller is successfully validated, at block 665, the shipping certificate validation process 510 compares the shipping identifiers from the receiving system against the shipping identifiers parsed from the signed shipping certificate. If the shipping identifiers from the receiving system match the shipping identifiers from the signed shipping certificate, at block 670, the shipping certificate validation process signals a successful validation of the received packages. The customer receiving delivery of the IHS and the additional items is thus assured that the received packages are the same packages shipped by the seller of the IHS or by another trusted entity.

If any discrepancies are detected between the shipping identifiers for the received packages and the shipping identifiers reported in the signed shipping certificate, at block 675, a partial validation of the delivery of IHS and the additional items may be reported. In some instances, such discrepancies may result from failure to receive packages that are identified in the signed shipping certificate. In some instances, such discrepancies may result from mismatched shipping information between the shipping identifiers for the received packages and the shipping identifiers in the signed shipping certificate. In other instances, such discrepancies may result from the detection of received packages that are not present in the signed shipping certificate. In all cases, any such discrepancies may be reported, thus allowing an administrator to investigate further and to decide whether continue use of the IHS.

As described, in some embodiments, the signed inventory certificate may also include an inventory of the factory installed hardware of an IHS. In such embodiments, the validation process may also include a comparison of the detected hardware components of the initialized IHS against the identities of the factory installed hardware components that are included in the signed certificate. If the unique identifiers of the detected hardware components of the initialized IHS match the identifiers of the factory installed hardware components from the signed certificate, the validation process may signal a successful validation of the detected hardware of the IHS. The customer receiving delivery of the IHS is thus assured that the IHS is operating using only hardware components that were installed at the factory during manufacture of the IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating secure delivery of an IHS (Information Handling System), the method comprising:
   obtaining, by the IHS, a plurality of shipping identifiers collected from a plurality of received packages;
   retrieving, by the IHS from its remote access controller, a cryptographically attestable shipping certificate uploaded to the remote access controller of the IHS during factory provisioning of the IHS, wherein the cryptographically attestable shipping certificate specifies a plurality of shipping identifiers and identity information of the remote access controller;
   cryptographically affirming, by the IHS, integrity of the shipping identifiers specified in the cryptographically attestable shipping certificate retrieved from the remote access controller of the IHS;
   retrieving, by the IHS, the identity information for the remote access controller specified in the cryptographically attestable shipping certificate;
   retrieving, by the IHS, the shipping identifiers specified in the cryptographically attestable shipping certificate, wherein individual ones of the plurality of shipping identifiers in the cryptographically attestable shipping certificate are associated with one or more of a plurality of shipped packages used to ship at least the IHS;
   comparing, by the IHS, identity information of the remote access controller of the IHS, obtained from the remote access controller, against the retrieved identity information for the remote access controller from the cryptographically attestable shipping certificate;
   comparing, by the IHS, the plurality of shipping identifiers collected from the received packages against the plurality of shipping identifiers from the cryptographically attestable shipping certificate retrieved from the remote access controller of the IHS;
   responsive to the two comparisons indicating a match, validating, by the IHS, the plurality of received packages as the same as the plurality of shipped packages used to ship at least the IHS; and
   providing information regarding the validating of the plurality of received packages to a user.

2. The method of claim 1, wherein the shipping identifiers specified in the cryptographically attestable shipping certificate further include shipping identifiers associated with one or more of the plurality of shipped packages used to ship additional items for use with the IHS.

3. The method of claim 2, wherein validating the plurality of received packages as the same as the plurality of shipped packages used to ship at least the IHS further comprises:
   validating the plurality of received packages as the same as the plurality of shipped packages used to ship the IHS and the additional items.

4. The method of claim 1, wherein the comparison identifies any shipping identifiers from the cryptographically attestable shipping certificate that are not present in the shipping identifiers collected from the received packages.

5. The method of claim 1, wherein the comparison identifies any of the shipping identifiers collected from the received packages that are not present in the shipping identifiers from the cryptographically attestable shipping certificate.

6. The method of claim 1, wherein the shipping identifiers comprise bar codes.

7. The method of claim 1, wherein the validating of secure delivery of the IHS is conducted by a pre-boot validation process of the IHS.

8. The method of claim 1, wherein the shipping certificate is uploaded to a persistent memory of the IHS via operations by the remote access controller of the IHS.

9. An IHS (Information Handling System) comprising:
   a remote access controller comprising a cryptographically attestable shipping certificate uploaded to the remote access controller during factory provisioning of the IHS, wherein the cryptographically attestable shipping certificate specifies a plurality of shipping identifiers and identity information of the remote access controller, and wherein individual ones of the plurality of shipping identifiers specified in the cryptographically attestable shipping certificate are associated with one or more of a plurality of shipped packages used to ship at least the IHS;
   one or more processors; and
   one or more memory devices coupled to the processors, the memory devices storing computer-readable instructions that, upon execution by the processors, cause a validation process to:
     cryptographically affirm integrity of the plurality of shipping identifiers specified in the cryptographically attestable shipping certificate retrieved from the remote access controller of the IHS;
     retrieve the identity information for the remote access controller specified in the cryptographically attestable shipping certificate;
     retrieve the plurality of shipping identifiers specified in the cryptographically attestable shipping certificate uploaded to the remote access controller during the factory provisioning of the IHS;
     compare identity information of the remote access controller of the IHS, obtained from the remote access controller, against the retrieved identity information for the remote access controller from the cryptographically attestable shipping certificate;
     compare a plurality of shipping identifiers collected from a plurality of received packages against the plurality of shipping identifiers from the cryptographically attestable shipping certificate retrieved from the remote access controller of the IHS;
     responsive to the two comparisons indicating a match, validate the plurality of received packages as the same as the plurality of shipped packages used to ship at least the IHS; and
     provide information regarding the validation of the plurality of received packages to a user.

10. The IHS of claim 9,
   wherein the plurality of shipping identifiers specified in the cryptographically attestable shipping certificate further include shipping identifiers associated with one or more of the plurality of shipped packages used to ship additional items for use with the IHS, and
   wherein to validate the plurality of received packages as the same as the plurality of shipped packages used to ship at least the IHS, the memory devices stores additional computer-readable instructions that, upon execution by the processors, cause the validation process to further:
     validate the plurality of received packages as the same as the plurality of shipped packages used to ship the IHS and the additional items.

11. The IHS of claim 9, wherein the shipping identifiers comprise bar codes.

12. The IHS of claim 9, wherein the validation process is a pre-boot process of the IHS.

13. The IHS of claim 9, further comprising a persistent memory, wherein the cryptographically attestable shipping certificate is uploaded to the persistent memory via the remote access controller during the factory provisioning of the IHS.

14. The IHS of claim 9, wherein the plurality of shipping identifiers collected from the plurality of received packages comprise RFID (Radio Frequency Identification) codes.

15. A computer-readable storage device having instructions stored thereon for validating secure delivery of an IHS (Information Handling System), wherein execution of the instructions by one or more processors of the IHS causes a validation process of the IHS to:
retrieve a cryptographically attestable shipping certificate uploaded to a remote access controller of the IHS during factory provisioning of the IHS, wherein the cryptographically attestable shipping certificate specifies a plurality of shipping identifiers and identity information of the remote access controller;
cryptographically affirm integrity of the shipping identifiers specified in the cryptographically attestable shipping certificate retrieved from the remote access controller of the IHS;
retrieve the identity information for the remote access controller specified in the cryptographically attestable shipping certificate;
retrieve the plurality shipping identifiers specified in the cryptographically attestable shipping certificate, wherein individual ones of the plurality of shipping identifiers in the cryptographically attestable shipping certificate is associated with one or more of a plurality of shipped packages used to ship at least the IHS;
obtain a plurality of shipping identifiers collected from a plurality of received packages; and
compare identity information of the remote access controller of the IHS, obtained from the remote access controller, against the retrieved identity information for the remote access controller from the cryptographically attestable shipping certificate;
compare the plurality of shipping identifiers collected from the plurality of received packages against the plurality of shipping identifiers from the cryptographically attestable shipping certificate retrieved from the remote access controller of the IHS;
responsive to the two comparisons indicating a match, validate the plurality of received packages as the same as the plurality of shipped packages used to ship at least the IHS; and
provide information regarding the validation of the plurality of received packages to a user.

16. The storage device of claim 15, wherein the shipping identifiers specified in the cryptographically attestable shipping certificate further include shipping identifiers associated with one or more of the plurality of shipped packages used to ship additional items for use with the IHS.

17. The storage device of claim 15, wherein the validation process is a pre-boot process of the IHS.

18. The storage device of claim 15, wherein the cryptographically attestable shipping certificate is uploaded to a persistent memory of the IHS via operations by the remote access controller of the IHS during the factory provisioning of the IHS.

19. The storage device of claim 15, wherein the plurality of shipping identifiers collected from the plurality of received packages comprise one or more of: RFID (Radio Frequency Identification) codes and bar codes.

* * * * *